United States Patent [19]

Rhodes

[11] 4,108,449

[45] Aug. 22, 1978

[54] STAIR-CLIMBING WHEELCHAIR

[76] Inventor: Thomas J. Rhodes, 508 Vilage View Pl., Fallbrook, Calif. 92028

[21] Appl. No.: 764,060

[22] Filed: Jan. 31, 1977

[51] Int. Cl.[2] .......... B62B 5/02

[52] U.S. Cl. .......... 280/5.28; 180/8 A

[58] Field of Search .......... 280/5.2, 5.22, 5.28, 280/242 WC, DIG. 10; 180/8 A, DIG. 3

[56] References Cited

U.S. PATENT DOCUMENTS

| | | | |
|---|---|---|---|
| 3,104,112 | 9/1963 | Crail | 280/5.2 |
| 3,169,596 | 2/1965 | Wright | 280/5.2 X |
| 3,196,970 | 7/1965 | Brenner | 180/8 A |
| 3,592,282 | 7/1971 | Soileau | 280/5.28 |

*Primary Examiner*—Robert R. Song
*Assistant Examiner*—Schrecengost R.
*Attorney, Agent, or Firm*—Whann & McManigal

[57] ABSTRACT

A wheelchair which has a seat, back and foot and leg supporting structure in which there are main and auxiliary wheels for supporting the body of the wheelchair when it is operating on a substantially level or smooth surface and in which there is climbing and descending means in the form of a flexible and pliable wheel which is brought into operating position when it: is desired to climb or descend a staircase, or when the wheelchair is moving over a very rough surface.

14 Claims, 15 Drawing Figures

STAIR-CLIMBING WHEELCHAIR

BACKGROUND OF THE INVENTION

1. Field of the Invention

My invention consists of a wheelchair which provides means whereby the wheelchair may operate over smooth level surfaces and may also be operated to climb or descend stairs.

There is an urgent need for such a structure which can be safely operated by the occupant of the wheelchair and in which the various elements are easy to operate and in which the wheelchair is of relatively simple construction.

I know of no such structure on the market today and I am acquainted with prior art patents found in a patent search, none of these patents, however, disclose anything comparable to my present invention.

2. Description of the Prior Art

The patent to R. W. McKinley issued Dec. 28, 1965, U.S. Pat. No. 3,226,129, discloses a wheelchair with wheels in which the periphery is articulated to lock over the edge of a step and thus provide traction. Stabilization while operating the chair for climbing or descent is provided by a second pair of movable articulated wheels which are described as being positioned to adjust to the stair angle to permit level ascent or descent. The chair has a high center of gravity. Precise adjustments are needed to pass over the edges of the steps. The chair is dangerous, complicated, of excessive weight, and is not a practical nor operative structure.

The patent to G. H. Green issued July 28, 1964, U.S. Pat. No. 3,142,351, discloses a wheelchair propelled by an arbiting walking beam. Stabilizing bars are extended to increase stability. There is no coordinating mechanism to cope with the problem of going over the top of the stairs smoothly. There are over 200 parts described indicating the complexity of the system. The weight of the chair would be considerable. There is danger of damage to stairs from rubbing parts.

The patent to G. D. Grogan issued Apr. 13, 1965, U.S. Pat. No. 3,178,193, discloses a wheelchair based on a complex hydraulic actuated pair of grousers which engage the stair steps and provide traction for moving the chair up the stairs. The weight of the chair is supported on a roller-supported continuous tread which is free wheeling. A hand crank makes angle adjustments of the tread angle for stair angle. The chair has a high center of gravity and a narrow base easily tipped forward. Precise adjustments are needed to descend and it is easily possible to fall backward when getting over the top of the stair.

Other patents known to me which are not of any pertinence whatsoever are listed as follows: U.S. Pats. E. O. Clay, No. 3,049,364, issued Aug. 14, 1962; W. E. Davis, et al., No. 3,054,622, issued Sept. 18, 1962; E. M. Richison, et al., No. 3,133,742, issued May 19, 1964; D. E. Brenner, No. 3,196,970, issued July 27, 1965; and B. M. Bradley, No. 3,438,641, issued Apr. 15, 1969.

SUMMARY OF THE INVENTION

My invention provides a wheelchair which consists of a body including a seat, a back and a foot and leg support provided to the seat. There are main wheels and auxiliary wheels which support the body during operation over a level or smooth surface.

My invention also provides a means whereby the wheelchair may climb and descend a staircase. To accomplish this I provide an inflated roller having a flexible and deformable periphery. The roller may be moved into operating position by an easy adjustment when it is desired to climb or descend the staircase.

My invention provides means in which the center of gravity of the wheelchair may be considerably lowered during the time that the wheelchair is climbing or descending. This is accomplished by moving the axis of the main wheels from a position below the seat structure to a position above the seat structure.

Also, for additional balance the foot and leg support may be moved into an extended position so that the occupant's legs extend forwardly.

The climbing and descending roller is supported by the foot and leg support and is brought into an operating position by the extending of the foot and leg support.

My invention provides a smooth and stable ascent and descent of the chair and this is particularly true at the top of the stairs where there is a transition from the upwardly extending angle of the stairs to the level floor. In chairs of the prior art at the top of the stairs the occupant is not only seated high above the stair edge, but is in a position to rock dangerously forwardly or backwardly while in transition.

In a chair of my invention there is no such discontinuity for a number of reasons, one of which is that the center of gravity is considerably lowered so that the occupant does not sit in a high position.

The chair of my invention is essentially a three-wheeled wagon which can ride up over the top step of the stairs and may be stable at all times without disturbing the upright position of the occupant.

The soft inflated roller with the sponge or pliable tread provides a smooth ride up the stairs or down the stairs and will accommodate steps of any variety of height and width within limits and without the problem of elaborate mechanism for matching drive systems to stairs.

Also, my invention provides a safety check system independent of the operating system which can positively check the descent of the wheelchair at any time should there be any malfunctioning of any parts.

The object of my invention is to provide the handicapped person with a new dimension of mobility. Through the practice of my invention the handicapped person with normal use of one or both arms can move easily up and down street curbs as well as up and down stairs, regardless of stair design or angle of ascent within the range of common architectural design.

A further object is to provide a wheelchair capable of moving easily over rough or rocky ground.

A further object is to provide a wheelchair which can accomplish the above objectives in a safe reliable way without damaging floors or stairs.

A still further object is to accomplish these objectives with a simple mechanical mechanism and at reasonable cost.

It is another object of my invention to provide a wheelchair of the character referred to in the preceding statement of my invention in which there is a climbing and descending element or means which is normally positioned in a non-operating location, but which by a simple operation of the occupant of the chair may be moved into an operating position whenever it is desired to climb or descend a staircase or when the wheelchair may be moving over an extremely rough surface.

It is still another object of my invention to provide for safety during ascent or descent by moving the main wheels into a raised position so that the seat of the wheelchair is substantially lowered which, of course, lowers the center of gravity and also gives the occupant of the chair a sense of security.

It is another object of my invention to provide simple operating means for raising or lowering the main wheels and for bringing the climbing and descending means from a non-operating into an operating position.

It is still another object of my invention to provide a wheelchair with a climbing and descending element, and in which the seat of the chair is at all times maintained in a level position which gives security to the occupant and enables him to be at all times in a comfortable position.

It is an object of my invention to provide a wheelchair in which:

(a) the chair acts as a three-wheeled cart to eliminate discontinuity at the stair edge;

(b) the chair has a wheelbase extensibility by movement of wheels and drive roll;

(c) the chair has a hinged foot and leg rest to permit occupant's limbs to straighten;

(d) this straightening motion not only gives base extensibility, but coupled with the backward and upward motion of the wheels, permits the occupant to sit substantially upright at all times;

(e) the step enveloping soft roller drive automatically conforms to the step pattern without compensating mechanical parts;

(f) the sponge rubber tread provides a unique method of increasing the ability of a pneumatic roller to mount a high step; and (g) the high load carrying capacity of the roller and belt drive give a new and effective application of this system to a wheelchair.

Other objects of my invention will be made evident during the following detailed description of the preferred form of my invention.

DESCRIPTION OF THE PREFERRED EMBODIMENTS

Figure 1:
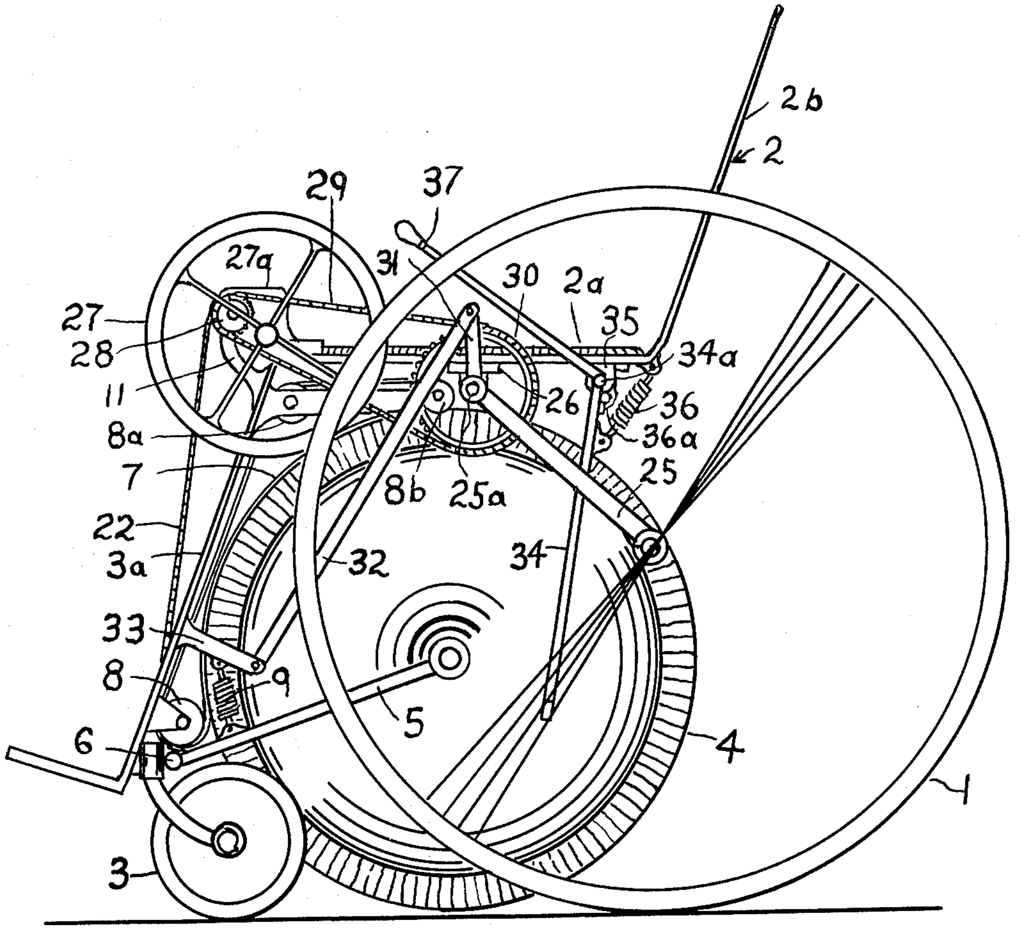
FIG. 1 shows a drawing of the wheelchair of my invention complete in left side view in normal position for locomotion of level ground.

FIG. 1 shows a left side view of the chair of my invention wherein it is shown that it includes a set of conventional large diameter wheels 1 attached to a body 2 having a chair structure with a seat 2*a* and utilizing conventional swivel wheels 3 under the leg and foot support 3*a*.

Combined with these conventional features are several additional elements such as a pneumatic roller or tire 4, attached to the chair structure by means of bearings which are in turn attached to the chair by means of bars 5 which, in turn, is fastened to the chair through movable pivot bearing 6. The pneumatic roller is arranged so that the weight of the chair and person is carried to the structure by means of a belt 7, which is continuous and runs over three free running rollers. This arrangement forms a saddle over the top of the roller and allows it to carry a much greater load than could be carried through the axles under the 1 to 1½ p.s.i. pressure range used. In order to hold the roller firmly against the belt a spring 9 is attached to the structure.

Figure 7:
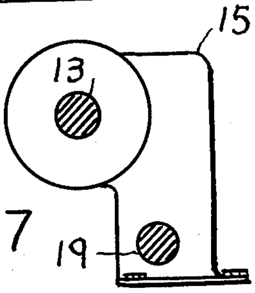
FIG. 7 shows a side view of a drive gear unit.

The roller and belt drive system is attached to the footrest 10 of the chair. This structure is hinged to the chair seat by means of brackets 11 and 11*a*, FIG. 2. These brackets are pivoted at 12 and 12*a* on the end of the drive shafts 13 and 13*a* of drive units shown in FIGS. 7 and 9.

Figure 2:
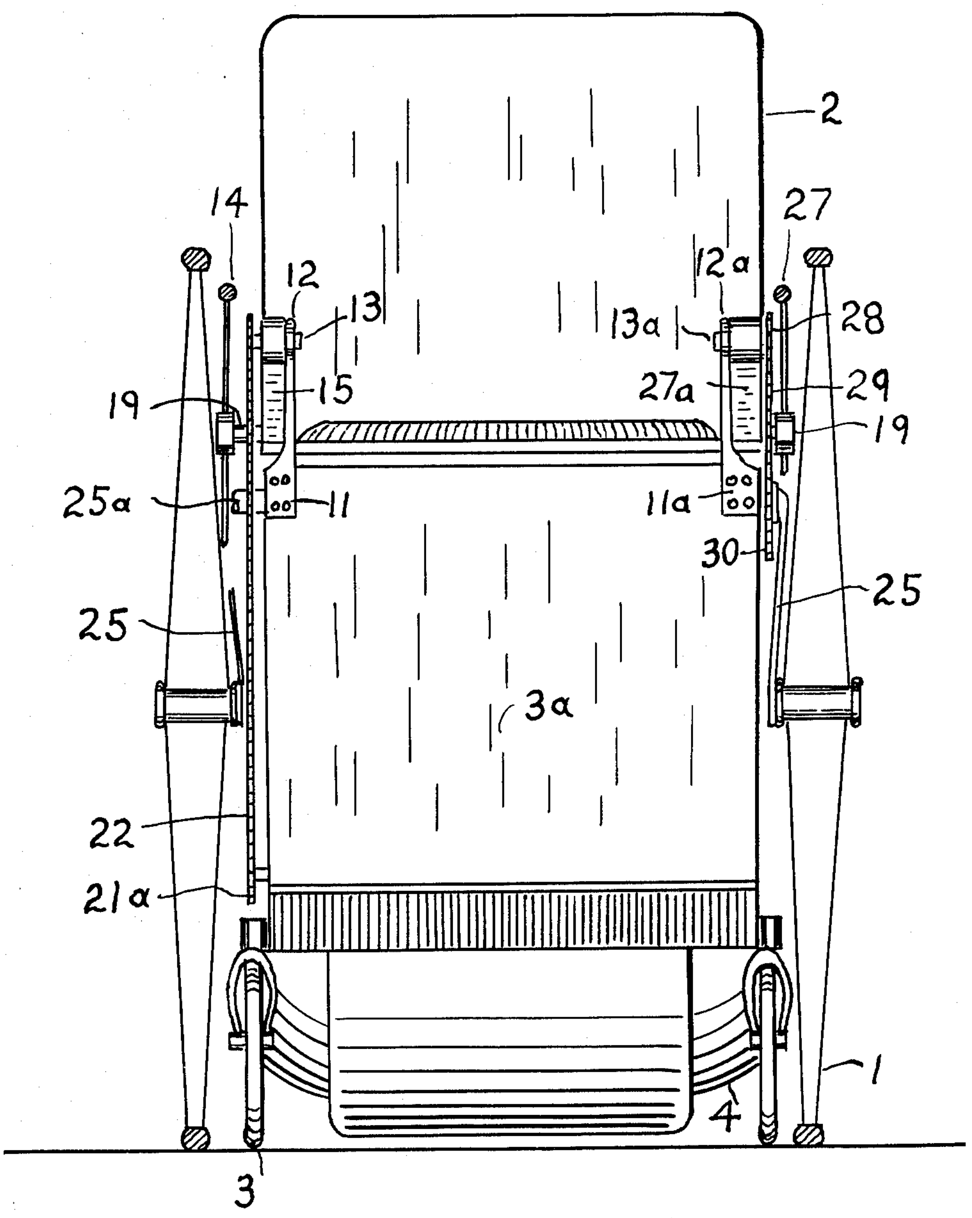
FIG. 2 shows a drawing of the wheelchair in front view in normal position for ground locomotion.
Figure 6:
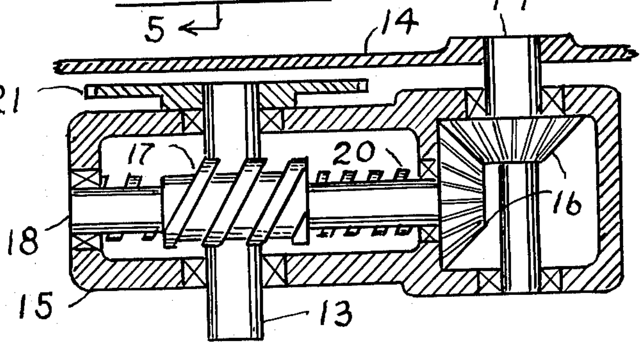
FIG. 6 shows a cross-section view of a drive gear unit used to set the chair in climbing position.

Pneumatic roller 4 is driven by means of a hand wheel 14 positioned at the right side of the wheelchair (see FIGS. 1, 2 and 6). A hand wheel is attached to shaft 19 which projects from a gear 16 in box 15, which is shown in cross-section in FIG. 6.

The hand wheel 14 operating through shaft 19 rotates bevel gears 16 which, in turn, rotate the shaft 18. Worm gear 17 on the shaft 18 drives a worm wheel 20, which is positioned below the shaft 18 and is mounted on and rotates shaft 13. The shaft 13 has fastened to it a gear 21 which drives a belt roller 8 through chain 22 and gear 21*a*. The roller 8, in turn, drives the belt 7 which, in turn, rotates the pneumatic roller 4. The rollers 8 and 8*b* are positioned to hold the belt 7 in engagement with the periphery of the pneumatic roller 4 so that the roller 4 can be driven by means of the hand wheel 14. The roller 8*a* is an idler roller which holds the upper part of the belt 7 clear of the lower portion of the belt.

Figure 4:
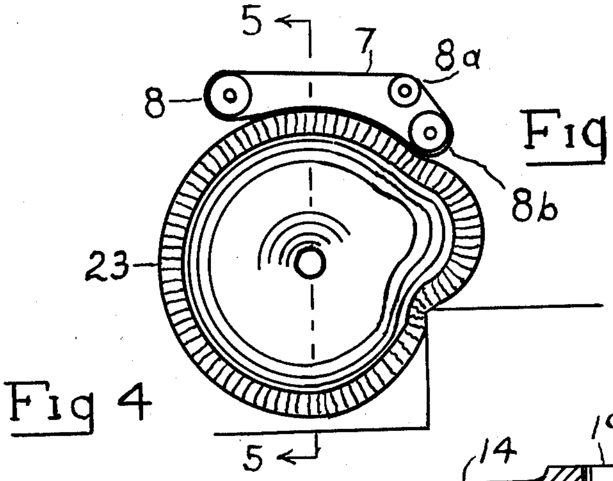
FIG. 4 shows a side view drawing of the inflated rubber tire and load system ready to mount a stair step.
Figure 5:
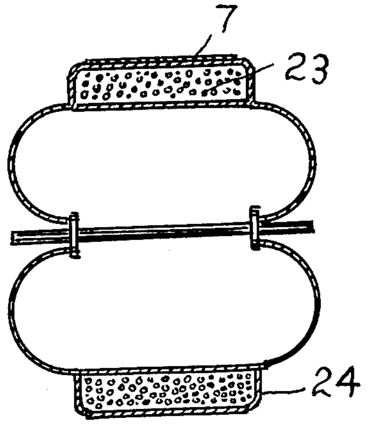
FIG. 5 shows a cross-section view of the inflated rubber tire, taken on the line 5—5 of FIG. 4.

The construction of the pneumatic roller is shown clearly in FIGS. 4 and 5. The roller or tire is made in a conventional way using radial tire construction with cords running across the tire from axle to axle and cords running radially around the circumference of the tire. The tread is designed to effectively grip a high step by enveloping the edge of the step as shown in FIG. 4. This is accomplished by using a thick tread of open or closed cell foamed material, either rubber or plastic, as shown at 23, FIGS. 4 and 5. The foam rubber tread is covered with a thin rubber for protection and wear resistance 24.

Figure 8:
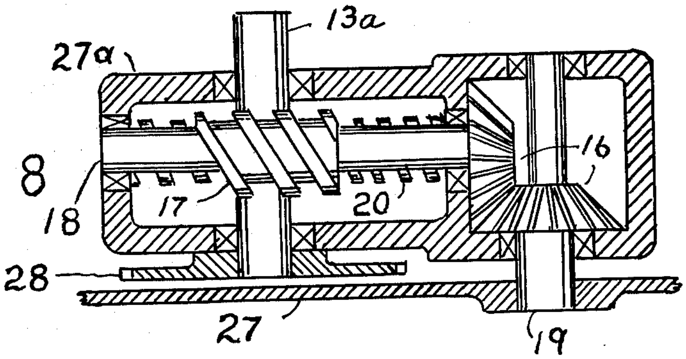
FIG. 8 is a cross-sectional view of the gear drive unit used to move the chair up and down stairs.
Figure 9:
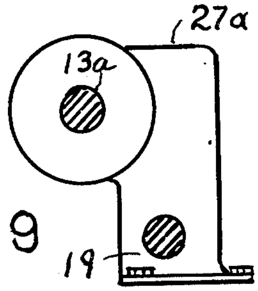
FIG. 9 is a side view in section showing the interior of this gear unit.

The wheels 1 of the chair are fastened to arms 25, shown in FIGS. 1 and 2, one at each side of the chair. These arms 25 are attached by welding to a tubular axle 25*a*, which extends transversely under the seat 2*a* and are rotatable in journals 26, one of which is shown in FIG. 1. The wheels 1 can be moved from their lowered position into their upper position and vice versa by rotating the axle 25*a*. This is accomplished by a manually operable drive wheel 27 shown in FIG. 2, which performs its function through a drive chain shown in FIGS. 8 and 9. The drive chain is in a gear box 27*a*, which is shown in FIGS. 8 and 9. Mounted on shaft 13*a*, which extends from gear box 27*a* is a sprocket 28 which drives a chain 29 shown in FIG. 2 which, in turn, drives a sprocket 30 fastened to the axle 25*a*. By rotating the hand wheel 27 the two main wheels 1 are movable from the position shown in FIGS. 1 and 2 into the position as shown in FIG. 3.

Figure 3:
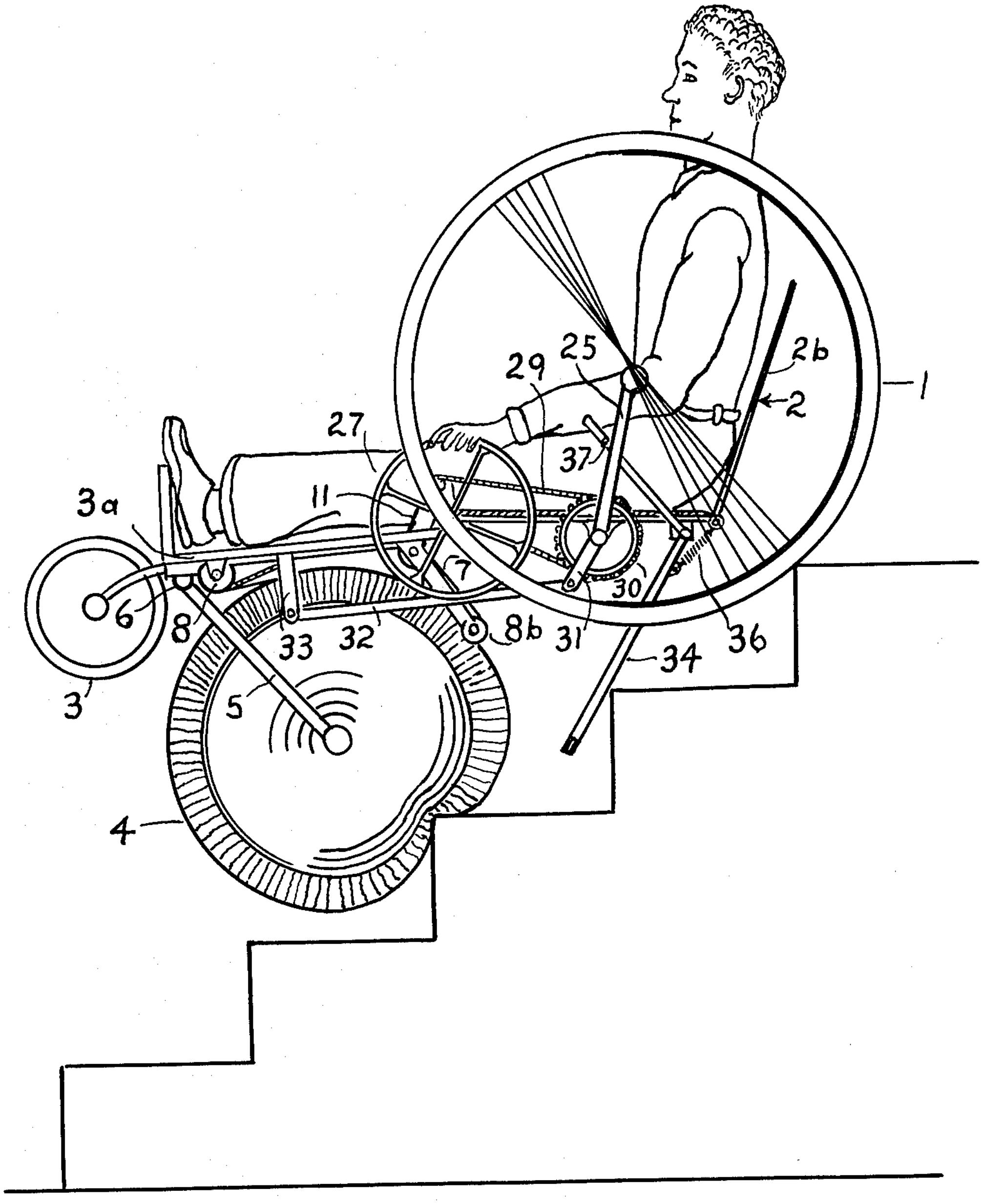
FIG. 3 shows a side view of the wheelchair reset in climbing position and ascending a stair.

The operation of the chair requires that the hinged footrest 10 can be moved from a normal sitting position as shown in FIG. 1 to a position wherein the occupant's legs are straight as shown in FIG. 3. This is accomplished by means of a linkage which connects the movement of the wheels with the forward movement of the footrest and is shown in FIG. 1. A lever arm 31 is fastened to the wheel axle 25*a* and connected by a pivot to link 32 which, in turn, is linked to a fixed arm 33 which is fastened rigidly to the footrest 10. This linkage is so arranged that the footrest moves forward simultaneously as the wheels move backward and upward. Movement of the foot and leg rest carries the tire 4 along with it and in addition to its other functions repositioning of the tire 4 will tend to maintain the seat 2*a* in its level position. Once the foot rest 10 is fully extended the linkage permits the wheels to be further rotated to adjust for the angle of the stairs.

The safety check system used to prevent descent in case of failure of the mechanism or total loss of traction is shown in FIGS. 1 and 3. It consists of a pair of bars 34 connected to a cross axle 34*a* which is rotatably mounted in journals 35 secured to the bottom of seat 2*a*. A spring 36 pulls the bars against a stop 36*a*. A lever 37 is fastened to the bar 34 and permits the operator to control the position of the bar.

Figure 11:
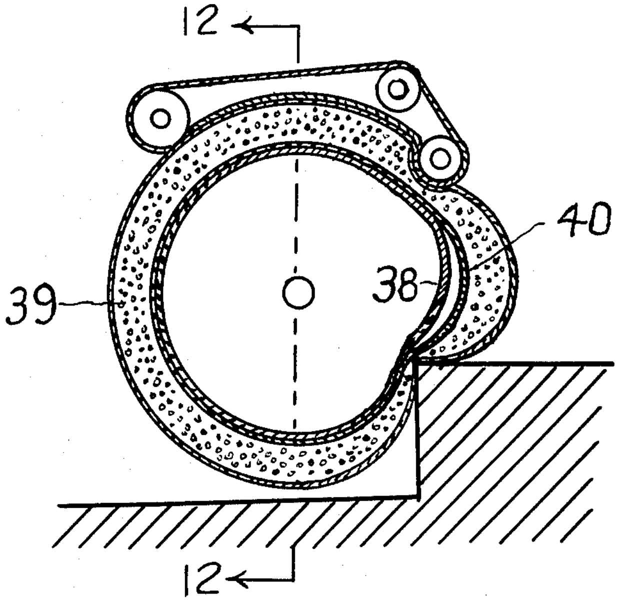
FIG. 11 shows a cross-section of an alternate inflated rubber tire utilizing the principle of a detached tread to facilitate grip on stair step.
Figure 12:
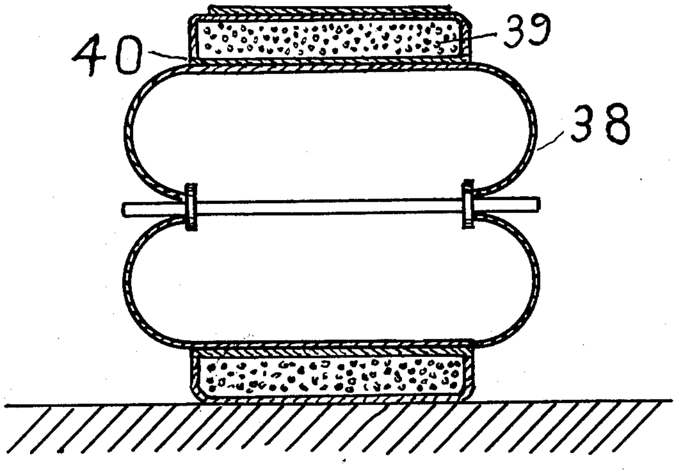
FIG. 12 shows a cross-section front view taken along the line 12—12 of FIG. 11 of this alternate tire.

An alternative configuration of the soft pneumatic roller used for driving the chair up the stairs is shown in FIGS. 11 and 12. This configuration increases the power of the roller to envelop the edge of the step, thus increasing traction and the capacity to mount high curbs or stair steps.

A side view of the assembly is shown in FIG. 11 in cross-section. The pneumatic roller 38, FIGS. 11 and 12, is the same as that previously described and shown in FIGS. 4 and 5. The tread 39, FIGS. 11 and 12, is not cemented directly onto the carcass, but is cemented to a continuous flexible band 40. This band tread is then mounted on the carcass and held in place by friction when the tire is inflated. The stiffness of the flexible band is sufficient to cause the band to bend over the edge of the step as shown and increase the pressure area and the total pressure on top of the step at the crucial point of ascent.

Figure 10:
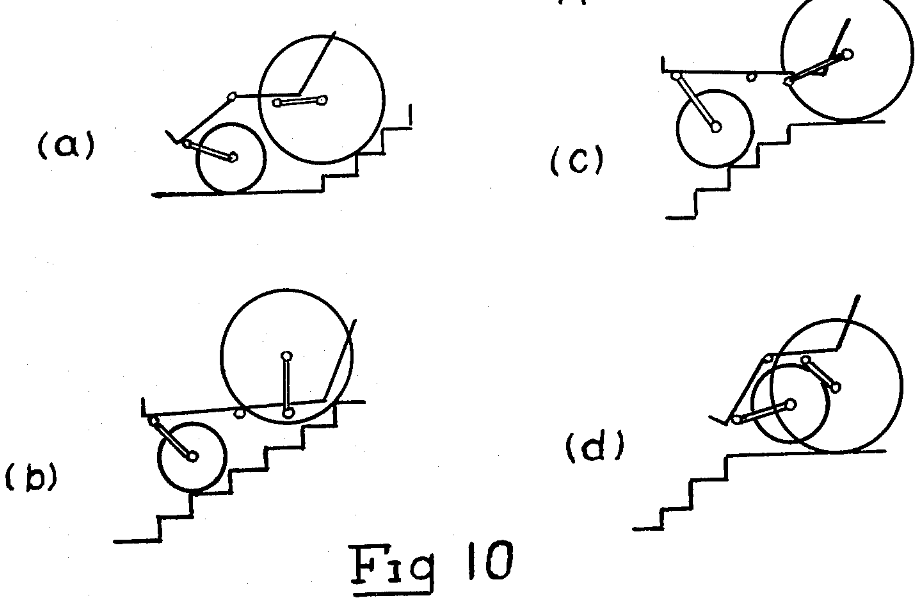
FIG. 10 *a, b, c* and *d* show schematically the chair in different positions in the ascent of a stair.

The operation of the chair can be explained by reference to a sequence of schematic drawings shown in FIG. 10.

The operator controls all the climbing functions of the chair by rotating either the right or left-hand wheels, either separately in sequence or simultaneously after long practice. The right-hand wheel drives the chair forward or backwards by rotating the roller 4, the left-hand wheel raises or lowers the rear wheels to keep the chair level and, in turn, maintain a proper balance of weight between the pneumatic roller and the rear wheels.

To ascend a stair the operator first backs his chair up to the first step. As the operator moves the wheelchair toward the step he raises the wheels so that as the wheels engage a higher step the seat will remain level. He then simultaneously or in sequential increments moves the wheels 1 up and advances the roller toward the step. He is then in position (*a*), FIG. 10. As he proceeds to move the roller up the stairs and adjusts the wheels to keep the chair level he arrives at point (*b*). He then proceeds to move up the stairs without further wheel adjustment by continuing to rotate the drive hand wheel. When he arrives at the top of the stairs the wheels will move out on the floor and the operator can then begin to lower the rear wheels as he further advances the roller drive arriving at position (*c*). Further movement of the wheels will restore the chair to normal position on top of the stairs as shown in (*d*).

To descend a stair the reverse sequence of operations is used. Safety requires that the chair be extended as shown in FIG. 10 (*c*) before moving over the lip of the stair to assure safe balance against pitching forward. Adjustments are made at (*c*) to bring the chair level for descent as shown in (*b*).

During the ascent of the stair the safety check bars 34, FIGS. 1 and 3, are held by spring pressure against the edge of each step. When the first step is surmounted the bar snaps to the second step and thus proceeds automatically up the stair. Should there be a mechanical failure or a sudden loss of traction under the roller the bar will drop down on the step and positively stop the chair from descending.

When descending the stair the bars are also used for safety. However, the lever 37, FIG. 1, must be used by the left hand during descent. As the right hand moves the chair down, the left hand moves the check bars over the edge of each step allowing the bar to momentarily halt the descent at each step. This check bar is also useful to maintain the chair at right angles to the steps. Should the chair drift from the upright during ascent it can be righted by temporarily reversing the roller bringing the bars against the step to square the chair with the stairs.

It is also possible to straighten the chair on the stairs or to correct drift to one side or the other on a long stair by holding one wheel 1 and turning the other, thus warping the chair in the right direction before proceeding up or down the stairs.

The above-described operations can be done quickly and smoothly with a little practice and will become substantially automatic. The normal sense of balance will easily maintain the chair in a level position regardless of the angle of ascent of the stair.

Other arrangements of the invention can be easily envisioned. A hydraulic pump and valve system could be used for the control and drive system. Power drive can be installed since the pneumatic roll drive has ample load carrying capacity.

Many advantages of the wheel chair can be cited. The chair is light in weight since the drive system is a light weight, low pressure pneumatic roller. No damage to the stair is possible due to the soft rubber roll carrying the weight. The ride up the stairs is smooth due to the extraordinary capacity of the soft roller to envelop the stair bumps. The chair can be designed with standard width and without any protuberances. Drive wheel ratios can be set to accommodate the strength of the operator.

I claim:

1. A wheelchair, the combination of:

(a) a body having a seat structure;

(b) main wheels and secondary wheels mounted on said body for supporting said body while said wheelchair is travelling over a relatively even surface;

(c) climbing and descending means for said body normally in a non-operating position; and (d) means for raising said main wheels rearwardly relative to said body and for moving said climbing and descending means into operating position whereby said body is supported by said main wheels and said climbing and descending means for enabling said wheelchair to climb or descend.

2. A combination as defined in claim 1 in which said body includes a foot and leg support pivotally connected to said seat structure and in which said climbing and descending means is supported by said foot and leg support.

3. A combination as defined in claim 2 in which said climbing and descending means is supported by said foot and leg support and in which said climbing and descending means is moved into operating position by swinging said foot and leg support into an extended position.

4. A combination as defined in claim 1 in which said main wheels are secured to arms pivoted to said body and said climbing and descending means is supported by a separate part pivoted to said seat structure in combination with means for pivoting said arms to raise the axis of said main wheels into a position above said seat structure, and for pivoting said separate part to move said climbing and descending means into operating position.

5. A combination as defined in claim 4 in which there is a manually operated means positioned adjacent said seat structure for simultaneously pivoting said arms and for pivoting said separate part.

6. A combination as defined in claim 1 which also includes means for operating said climbing and descending means in order to cause said wheelchair to climb or descend.

7. A combination as defined in claim 4 in which said climbing and descending means is in the form of a rotatable wheel and in which there is a means for rotating said climbing and descending wheel, comprising a movable belt engaging the upper periphery of said climbing and descending wheel and means for moving said belt to rotate said climbing and descending wheel.

8. In a wheelchair, a combination of:

(a) a body having a seat structure and a foot and leg support pivoted thereto;

(b) main wheels for supporting said body;

(c) main wheels support means connected to said wheels and said body whereby said main wheels may be moved from a normal position in which the axis of said main wheels is below said seat structure, in which position said wheelchair operates on a substantially level surface into a position in which the axis of said main wheels is positioned above said seat structure, in which position said parts are arranged for climbing or descending;

(d) climbing and descending means mounted on said foot and leg support;

(e) means for swinging said foot and leg support upwardly relative to said seat structure to bring said climbing and descending means into climbing and descending position; and (f) means for operating said climbing and descending means to cause said wheelchair to climb or descend.

9. A combination as defined in claim 8 in which said climbing and descending means consist of a rotatable wheel having a resilient and deformable periphery and in which there is a means for rotating said climbing and descending wheel, said operating means consisting of an endless belt engaging a portion of the upper periphery of said climbing and descending wheel, and means for moving said belt.

10. A combination as defined in claim 8 in which there is a means connected to said body and said foot and leg support for simultaneously raising and lowering same relative to said seat structure.

11. A combination as defined in claim 10 in which said means for moving said main wheels and said foot and leg support is positioned at one side of said seat structure and in which said means for rotating said climbing and descending wheel is on the other side of said seat structure.

12. A combination as defined in claim 1 in which there is a manually operable safety bar adapted to engage a stair tread to restrain descending movement of said wheelchair.

13. A combination as defined in claim 1 in which there is a foot and leg support pivoted to said seat structure and in which said climbing and descending means is supported by said foot and leg structure and in which said climbing and descending means is moved into an operating position by extending said foot and leg support into a substantially horizontal position.

14. A combination as defined in claim 12 in which said safety bar consists of a bar pivotally supported by said body, a manually engageable handle for moving said bar and spring means normally holding said bar in a depending position.

* * * * *